United States Patent
Salamon et al.

(10) Patent No.: US 6,605,190 B1
(45) Date of Patent: Aug. 12, 2003

(54) STAGED OPTIMAL EXTERNALLY-CONTROLLED SYSTEMS AND METHOD THEREOF

(75) Inventors: Peter Salamon, San Diego, CA (US); Bjarne Bogeskov Andresen, Vaerlose (DK); James Darwin Nulton, San Diego, CA (US)

(73) Assignee: San Diego State University Foundation, San Diego, CA (US)

( * ) Notice: Subject to any disclaimer, the term of this patent is extended or adjusted under 35 U.S.C. 154(b) by 0 days.

(21) Appl. No.: 08/801,038

(22) Filed: Feb. 14, 1997

(51) Int. Cl.$^7$ ................................................. B01D 3/42
(52) U.S. Cl. .................. 203/1; 203/2; 203/3; 203/100; 203/DIG. 4; 202/160; 202/206
(58) Field of Search ........................ 203/2, 1, 3, 24–27, 203/100, DIG. 4, DIG. 18; 202/160, 206, 158; 62/40

(56) References Cited

U.S. PATENT DOCUMENTS

| | | | | |
|---|---|---|---|---|
| 3,354,053 A | * | 11/1967 | Johnson | ........................ 203/2 |
| 3,788,066 A | * | 1/1974 | Nebgen | ........................ 62/208 |
| 3,830,698 A | * | 8/1974 | Kleiss | ........................ 202/160 |
| 3,905,873 A | | 9/1975 | Wright et al. | |
| 4,030,986 A | | 6/1977 | Shinskey | |
| 4,234,391 A | | 11/1980 | Seader | |
| 4,251,325 A | * | 2/1981 | Marsh et al. | ........................ 203/2 |
| 4,345,971 A | * | 8/1982 | Watson | ........................ 203/100 |
| 4,350,571 A | * | 9/1982 | Erickson | ........................ 62/40 |
| 4,444,576 A | * | 4/1984 | Ryan et al. | ........................ 203/DIG. 4 |
| 4,537,660 A | * | 8/1985 | McCord | ........................ 203/DIG. 4 |
| 4,615,770 A | | 10/1986 | Govind | |
| 4,626,321 A | | 12/1986 | Grethlein et al. | |
| 4,773,968 A | * | 9/1988 | O'Connell et al. | ........................ 203/26 |
| 4,961,826 A | | 10/1990 | Grethlein et al. | |
| 5,080,761 A | | 1/1992 | Emmrich et al. | |
| 5,124,004 A | | 6/1992 | Grethlein et al. | |
| 5,132,918 A | * | 7/1992 | Funk | ........................ 364/501 |
| 5,230,217 A | | 7/1993 | Agrawal et al. | |
| 5,260,865 A | * | 11/1993 | Beauford et al. | .... 203/DIG. 18 |
| 5,435,436 A | | 7/1995 | Manley | |
| 5,770,019 A | * | 6/1998 | Kurematsu et al. | ........................ 202/160 |

FOREIGN PATENT DOCUMENTS

| | | | | |
|---|---|---|---|---|
| EP | WO 82/00958 | | 4/1982 | |
| SU | 0596263 | * | 3/1978 | ........................ 203/2 |
| SU | 1808344 | * | 4/1993 | ........................ 202/160 |

OTHER PUBLICATIONS

Brown, "Enthalpy Control with Conventional Instrumentation", Industrial & Engineering Chemistry vol. 55 # 9, pp. 36 & 37, Sep. 1963.*

(List continued on next page.)

Primary Examiner—Virginia Manoharan
(74) Attorney, Agent, or Firm—Fish & Richardson P.C.

(57) ABSTRACT

The method and system of the present invention is designed to minimize exergy consumption consistent with a given level of product purity. For example, in a distillation system, the design employs a plurality of thermostatted trays which are maintained at a sequence of temperatures specified by finding the optimal control for an irreversible thermodynamic process. The specified temperatures at each tray are achieved with the help of a tandem heat pump which works over the range of required temperatures and which delivers the specified heat demands.

6 Claims, 7 Drawing Sheets

OTHER PUBLICATIONS

Canfield, Frank, "Computer Simulation of the Parastillation Process", Chemical Engineering Progress V80 n 2 Feb. 1984.*

Agrawal and Fidkowski, *Ind. Eng. Chem. Res.*, 35:2801–2807 (1996).

Dhole, *Ph.D. Thesis*, Vistoria University of Manchester, Faculty of Technology, Chapter 1 (1991).

Diosi et al., *Journal of Chemical Physics*, 105:11220 (1996).

Fidkowski and Krolikowski, *AIChE Jrnl.*, 36:1275 (1990).

Fidkowski and Krolikowski, *AIChE Jrnl.*, 33:643 (1987).

Finn, *Chemical Engineering Progress*, 89:41 (1993).

Fonyo, *Int. Chemical Engng.*, 14:18 (1974).

Fonyo, *Int. Chemical Eng.*, 14:203 (1974).

Glenchur and Govind, *Separation Science and Technology*, 22:2323 (1987).

Kaiser and Gourlia, *Chem. Eng.*, p. 45 (Aug. 19, 1985).

Lueprasitsakul et al., *Journal of Chemical Engineering of Japan*, 23:686 (1990).

Lynd and Grethlein, *AIChE Journal*, 35:1347 (1986).

Meili, *Chemical Engineering Process*, 86:60 (1990).

Nulton et al., *J. Chem. Physics*, 83:334 (1995).

Ratkje et al., *I & EC Research*, 34:3001–3007 (1995).

Salamon and Berry, *Physical Review Letters*, 51:1127–1130 (1983).

Shinskey, *Distillation Control*, McGraw–Hill Book Company, New York (1984), pp. 54–59 and 317–333.

Tondeur and Kvaalen, *Ind. Eng. Chem. Res.*, 26:50–56 (1987).

Tsirlin et al., *J. Phys. Chem.*, 98:3330 (1994).

* cited by examiner

Reversed Brayton Cooling Cycle

STAGED OPTIMAL EXTERNALLY-CONTROLLED SYSTEMS AND METHOD THEREOF

BACKGROUND OF THE INVENTION

The invention relates to minimizing energy consumption in staged externally-controlled systems.

Staged externally-controlled processes where temperature is the control include distillation processes and chemical reactor processes. Other staged processes can be pressure controlled, such as membrane separation processes like isotope diffusion processes and reverse osmosis processes. Further, staged mechanical controls can apply to staged centrifugation processes.

At the present time, distillation processes account for more than 10% of industrial energy consumption in the United States. Any significant improvement in the efficiency of such processes would result in substantial savings of energy. The traditional fractional distillation column is structured with: (a) one point of heat input (i.e., a reboiler contained in a bottom tray); and (b) a point of heat removal (i.e., a condenser contained in a top tray). Articles suggesting the use of additional heat sources or heat sinks to improve the efficiency of distillation systems include:

1a. "Control of Sidestream and Energy Conservation Distillation Towers," H. A. Mosler, Industrial Process Control (AIChE, NY, 1979);

1b. Conserving Energy in Distillation, T. W. Mix and J. S. Dweck, (MIT Press, Cambridge, 1982);

1c. Distillation Control, F. G. Shinskey (McGraw-Hill, NY, 1984);

2a. "Distillation with Intermediate Heat Pumps and Optimal Sidestream Return," AIChE Jrnl. 32:1347–1359 (August 1986);

2b. "Minimum Energy Requirements of Thermally Coupled Distillation Systems", AIChE Jrnl. Vol. 33, No. 4, (pp. 643–653, April 1987);

2c. "Heat Pumps for Distillation Columns," A. Meili, Chemical Engineering Progress, 86:60 (1990);

2d. "Energy Requirements for Nonconventional Distillation Systems," Z. Fidkowski and L. Krolikowski, AIChE Jrnl., 36, 1275 (1990);

2e. "Consider Thermally Coupled Distillation," A. J. Finn, Chemical Engineering Progress, 89, 41 (1993);

2f. "On the Use of Intermediate Reboilers in the Rectifying Section and Condensers in the Stripping Section of a Distillation Column," R. Agrawal and Z Fidkowski, Ind. Ch. Res., 35:2801–2807 (1996);

3a. "Thermodynamic Analysis of Rectification I and II, Reversible Model of Rectification & Finite Cascade Models," Z. Fonyo, Int. Chemical Engng. 14:18 (1974) and 14:203 (1974);

3b. "The Ideal Column Concept: Applying Exergy to Distillation," V. Kaiser and J. P. Gourlia, Chem. Eng., P. 45 (Aug. 19, 1985);

3c. Industrial Energy Management, V. Kaiser (Institut Francais du Petrole Paris, 1993);

3d. "Equipartition of Entropy Production: An Optimality Criterion for Transfer and Separation Processes", D. Tondeur and E. Kvaalen, Ind. Eng. Chem. Res., V. 26, 50–56 (1987);

3e. "Analysis of Entropy Production Rates for Design of Distillation Columns," S. Ratkje, E. Sauar, E. M. Hansen, K. M. Lien, and B. Hafskjold, I & EC Research, 34:3001–3007 (1995);

4. "Finite Time Thermodynamics: Limiting Performance of Rectification and Minimal Entropy Production in Mass Transfer," A. M. Tsirlin, V. A. Kazakov, and R. S. Berry, J. P. Chm., 98:3300–3336 (1994);

5a. "Thermodynamic Length and Dissipated Availability," P. Salamon & R. S. Berry. Physical Review Letters, 51:1127–1130 (1983); and 5b. "Quasistatic Processes as Step Equilibrations," J. Nulton, P. Salamon, B. Andresen, and Qi Anmin, J. of Chem. Physics, 83, 334 (1985).

The articles listed above are categorized according to technical content in relation to the present invention. Articles 1a–1c are directed to general methodologies of adding heat pumps to effect energy savings from column operation. Articles 2a–2f describe specific examples of these methodologies, but are limited to one additional reboiler and condenser. In some of the examples, a heat pump uses the distillate as its working fluid (vapor recompression). In others, sidestream removal and readdition is used with possible thermal contact outside the column. Articles 3a–3e are directed to examples of multi-tray systems in which the possibility of heat addition and removal at each tray is raised. Their analyses are purely for comparison as idealized aids to analysis of real processes. The specific nature and amount of control at each stage is discussed only in article 3d, which does not present a means for effecting the equal entropy production criterion. This proposition is examined further in article 3e with disappointing results. Article 4 suggests controlling continuous (as opposed to staged) distillation process by adjusting the concentration profile. Articles 5a and 5b describe application of the equal thermodynamic distance principle in a multi-step process for one working fluid traversing a sequence of states.

The approach to heat integration can include the use of a heat pump with at most two points of contact with the column augmented by possible removal and readdition of the distillate material. Prior U.S. patents that address efficiency-improved distillation columns include, for example: F. G. Shinskey, U.S. Pat. No. 4,030,986, "Control for Maximizing Capacity and Optimizing Product Cost of Distillation Column"; G. Emmrich, et al., U.S. Pat. No. 5,080,761, "Method of Optimizing the Operation of a Distillation Column Provided with a Side Heating Device"; R. Agrawal, et al., U.S. Pat. No. 5,230,217, "Inter-Column Heat Integration for Multi-Column Distillation System"; and R. Agrawal, U.S. Pat. No. 5,289,688, "Inter-Column Heat Integration for Multi-Column Distillation System."

SUMMARY OF THE INVENTION

The invention is directed to maintaining equal thermodynamic distances between stages in a thermodynamic process. The invention relates, in one embodiment, to a distillation system which minimizes exergy consumption in a distillation column by using heat exchange optimally distributed along the column. The system employs a plurality of thermostatted trays which are maintained at a sequence of temperatures specified by maintaining equal thermodynamic distances between the trays. The system can include a unique employment of heat pumps to attain the desired control. The total heat requirement at the boiler decreases by a factor between two and ten when the temperature of each tray in a column is controlled. The decreased heat requirement is accompanied by a similar reduction in the exergy loss.

In one aspect, the invention features a thermal distillation system. The system includes a plurality of thermostatically controlled trays distributed along a length of a distillation column and a means connected to the trays effective to maintain equal thermodynamic distances between the trays. The means can be a heat flow controller. The means can include a heat pump. The heat pump can be a tandem heat pump, which can be integrated in the design of the distillation column.

The heat pump can include an evaporator, a condenser, a compressor, and a throttling valve connected in series through a conduit. The throttling valve is adapted to circulate a refrigerant to perform a heat exchange cycle. The throttling valve is thermally connected to each of the trays and effective to control the amount of heat transferred to or extracted from the trays. The throttling valve can be an elongated small diameter tube.

In preferred embodiments, the distillation system includes: a distillation column having a bottom tray and top tray; a plurality of intermediate trays disposed between the bottom tray and the top tray, the bottom tray serving as a distillation bottom; a heat source in thermal contact with the bottom tray and effective to supply significant heat energy to the distillation bottom; and a first heat exchanger connected to the intermediate trays. The first heat exchanger can be distributed among the intermediate trays. The first heat exchanger can operate in a reversed Brayton cycle. Alternatively, the first heat pump can include a first conventional heat exchanger. The heat source can be an absorption heat pump and can supply significant heat energy to the column and the absorption heat pump.

The distillation system can also include a heat sink in thermal contact with the top tray and effective to extract significant heat energy from the top tray. The heat sink can include a second conventional heat exchanger. The first and second conventional heat exchangers can be interconnected to form a complete heat pump system.

In another aspect, the invention features a method of minimizing energy consumption in a staged thermodynamic process by maintaining equal thermodynamic distances between each stage in the process. The method can include controlling the amount of heat transferred to or extracted from each stage, controlling the pressure of each stage, or controlling the concentration of a reactant in each stage.

In preferred embodiments, the method includes setting the temperature of each stage in the thermodynamic process. The thermodynamic process can include a first stage and the controlling step can include supplying significant heat energy to the first stage. The thermodynamic process can also include an intermediate stage in which the controlling step includes supplying heat energy to the intermediate stage. The thermodynamic process can further include a last stage, where the controlling step includes extracting significant heat energy from the last stage.

In preferred embodiments, the thermodynamic process is a distillation process.

The invention may include one or more of the following advantages. The system applies the equal thermodynamic distance principle to the steady state operation of a distillation column. This extension is far from obvious and requires mapping the processes in the column to a different transformation of a multicomponent multiphase system. In particular, this required dealing with the "null directions problem" (directions along which the system can move with zero distance traversed and thus with zero dissipation as measured by the geometry) corresponding to changing the amount of any phase (scaling). In addition, the use of additional heat sources or heat sinks can result in possible energy savings.

These and other features and advantages of the invention will be apparent from the following detailed description, and from the claims.

DETAILED DESCRIPTION

Figure 1:
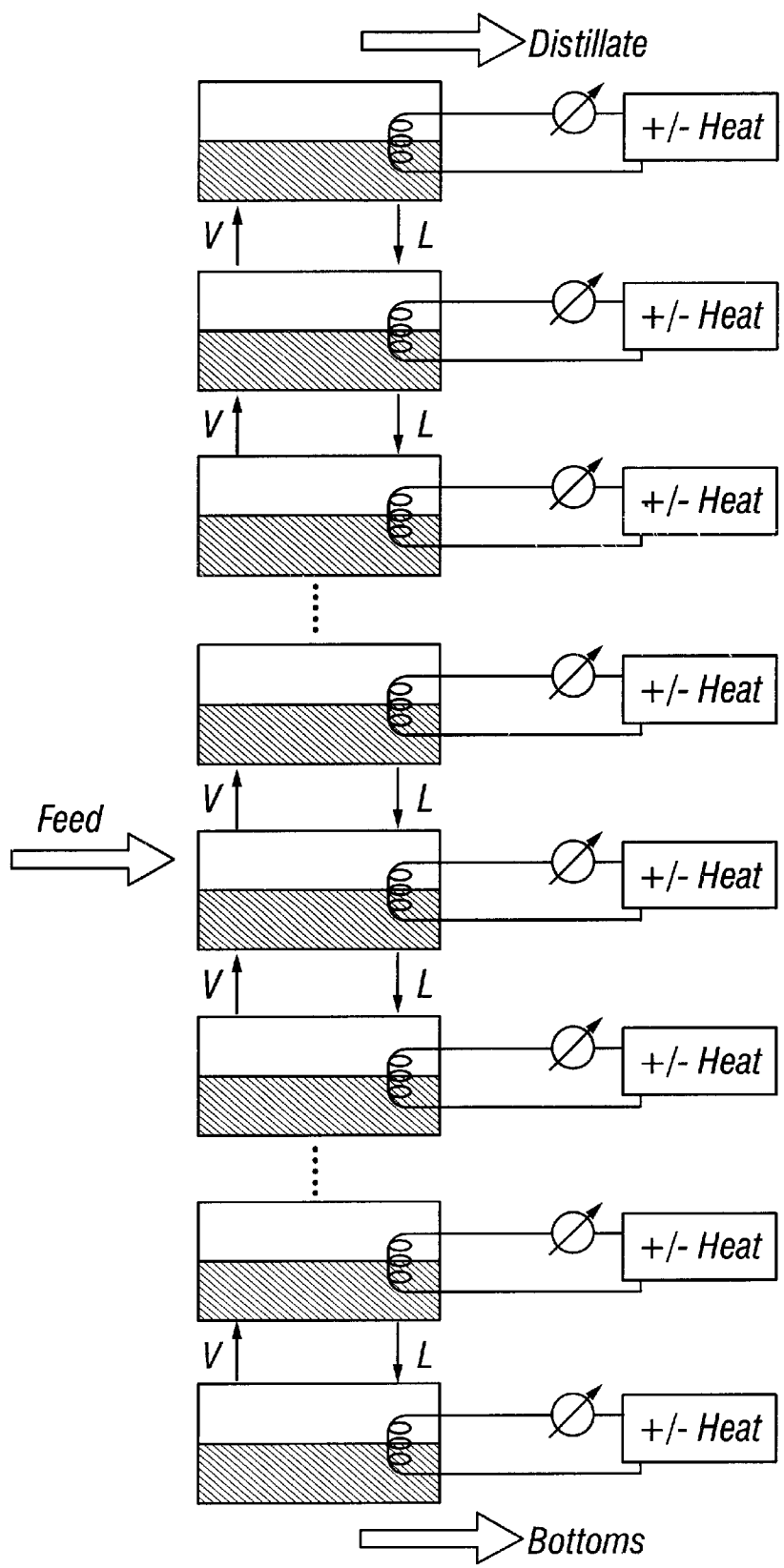
FIG. 1 is a schematic diagram of the distillation system of the present invention showing a plurality of staged trays on which heat flows are adjusted to maintain a desired temperature profile.

Energy consumption in staged externally-controlled processes, such as in thermally-controlled process (e.g., a distillation system), can be minimized by maintaining equal thermodynamic distances between stages in the process. In this example, this is achieved by optimally distributing heat exchange on each stages. The geometry of a thermodynamic system is obtained by using the second derivative of the entropy of the system as a Riemannian metric on its manifold of equilibrium states. See, e.g., G. Ruppeiner, "Riemannian Geometry in Thermodynamic Fluctuation Theory," Reviews of Modern Physics, 67:605 (1995), F. Weinhold, "The Metric Geometry of Equilibrium Thermodynamics I–V," Journal of Chemical Physics, 63:2479 (1975); 63:2484 (1975); 63:2488 (1975); 63:2496 (1975); and 65:559 (1976), P. Salamon, and R. S. Berry, "Thermodynamic Length and Dissipated Availability," Physical Review Letters, 51:1127 (1983), and J. Nulton, P. Salamon, B. Andresen, and Qi Anmin, "Quasistatic Processes as Step Equilibrations," Journal of Chemical Physics, 83:334 (1985).

If X denotes the vector of extensive variables of the thermodynamic system, $X=(E,V,N_1,N_2,\ldots)$ and the entropy S is expressed as a function of X, the metric matrix in the coordinates X in this entropy representation takes the form of the second derivative $D^2S$. Accordingly, the length associated with an infinitesimal displacement dX is shown in equation 1:

$$\|dX\| = dX^t D^2 S \, dX \qquad (1)$$

The distance traversed along a process X(t) is described by equation 2:

$$\|X\| = \int_{t_{initial}}^{t_{final}} \sqrt{\dot{X}^t D^2 S \dot{X}}\, dt \qquad (2)$$

where $\dot{X}=dX/dt$.

One convenient method of performing the calculation in the alternative energy representation is to work with the second derivative matrix of the internal energy with respect to the extensive variables, where the entropy S has replaced the internal energy. Once the length element has been computed for this metric, the length element for the metric above differs exactly by a factor of the temperature. See, e.g., P. Salamon, J. Nulton and E. Ihrig, "On the Relation between Energy and Entropy Versions of Thermodynamic Length," Journal or Chemical Physics, 80:436 (1984).

The thermodynamic distance can be calculated between stages in a staged thermodynamic process. For example, the thermodynamic distance for a two-phase binary mixture is calculated by a sequence of reductions in dimension until we reach the three-dimensional submanifold of coexistence between the two phases. The mass balance equations (establishing the net tray-to-tray transport) determine a curve in that submanifold, along which the distance is calculated.

Initially, the two-phase binary mixture is described in the eight-dimensional space of the variables:

$N_{ij}$=moles of component i in phase j, where i,j=1 or 2;

$S_j$=entropy of phase j, where j=1 or 2; and $V_j$=volume of phase j, where, j=1 or 2.

Accordingly, the metric matrix in this coordinate system is block diagonal:

$$\begin{bmatrix}
\frac{\partial^2 E}{\partial S_1^2} & \frac{\partial^2 E}{\partial S_1 \partial V_1} & \frac{\partial^2 E}{\partial S_1 \partial N_{11}} & \frac{\partial^2 E}{\partial S_1 \partial N_{21}} & 0 & 0 & 0 & 0 \\
\frac{\partial^2 E}{\partial S_1 \partial V_1} & \frac{\partial^2 E}{\partial V_1^2} & \frac{\partial^2 E}{\partial V_1 \partial N_{11}} & \frac{\partial^2 E}{\partial V_1 \partial N_{21}} & 0 & 0 & 0 & 0 \\
\frac{\partial^2 E}{\partial S_1 \partial N_{11}} & \frac{\partial^2 E}{\partial V_1 \partial N_{11}} & \frac{\partial^2 E}{\partial N_{11}^2} & \frac{\partial^2 E}{\partial N_{11} \partial N_{21}} & 0 & 0 & 0 & 0 \\
\frac{\partial^2 E}{\partial S_1 \partial N_{21}} & \frac{\partial^2 E}{\partial V_1 \partial N_{21}} & \frac{\partial^2 E}{\partial N_{11} \partial N_{21}} & \frac{\partial^2 E}{\partial N_{21}^2} & 0 & 0 & 0 & 0 \\
0 & 0 & 0 & 0 & \frac{\partial^2 E}{\partial S_2^2} & \frac{\partial^2 E}{\partial S_2 \partial V_2} & \frac{\partial^2 E}{\partial S_2 \partial N_{12}} & \frac{\partial^2 E}{\partial S_2 \partial N_{22}} \\
0 & 0 & 0 & 0 & \frac{\partial^2 E}{\partial S_2 \partial V_2} & \frac{\partial^2 E}{\partial V_2^2} & \frac{\partial^2 E}{\partial V_2 \partial N_{12}} & \frac{\partial^2 E}{\partial V_2 \partial N_{22}} \\
0 & 0 & 0 & 0 & \frac{\partial^2 E}{\partial S_2 \partial N_{12}} & \frac{\partial^2 E}{\partial V_2 \partial N_{12}} & \frac{\partial^2 E}{\partial N_{12}^2} & \frac{\partial^2 E}{\partial N_{12} \partial N_{22}} \\
0 & 0 & 0 & 0 & \frac{\partial^2 E}{\partial S_2 \partial N_{22}} & \frac{\partial^2 E}{\partial V_2 \partial N_{22}} & \frac{\partial^2 E}{\partial N_{12} \partial N_{22}} & \frac{\partial^2 E}{\partial N_{22}^2}
\end{bmatrix}$$

It is thus sufficient to treat the two four-by-four matrices of each phase separately, omitting the index j which indicates the phase. Each four-by-four matrix can be further block diagonalized with a change of coordinates to the variables:

T=temperature;

p=pressure;

$N_1$=moles of component 1; and $N_2$=moles of component 2.

Using subscripts to indicate partial derivatives of the terms, the metric for one phase is described by matrix 3 in terms of Gibbs free energy G.

$$\begin{bmatrix}
-G_{TT} & G_{Tp} & 0 & 0 \\
G_{Tp} & -G_{pp} & 0 & 0 \\
0 & 0 & G_{N_1 N_1} & G_{N_1 N_2} \\
0 & 0 & G_{N_1 N_2} & G_{N_2 N_2}
\end{bmatrix} \qquad (3)$$

By restricting the conditions to constant pressure, for example, one degree of freedom is eliminated by replacing $N_1$ and $N_2$ with:

$x=N_1/(N_1+N_2)$=mole fraction of component 1;

and $N=N_1+N_2$=total number of moles.

These changes reduce matrix 3 to metric matrix 4.

$$\begin{bmatrix}
-G_{TT} & 0 & 0 \\
0 & \frac{-G_{N_1 N_2} N^2}{x(1-x)} & 0 \\
0 & 0 & 0
\end{bmatrix} \qquad (4)$$

The third degree of freedom in this coordinate system is N, which is a scaling direction and can be neglected. The relationship x(T) between the remaining two coordinates is valid along the coexistence curve. The resulting length squared of a displacement dT is described by equation 5:

$$\|dL\|_\varepsilon^2 = \left(-G_{TT} + \frac{-G_{N_1 N_2} N^2}{x(1-x)} \left(\frac{dx}{dT}\right)^2 \right) dT^2 \qquad (5)$$

The squared length elements are combined using the fact that the temperatures $T_j$ of the two phases must be equal for two coexistent phases. The resulting length squared is shown in equation 6.

$$\|dL\|_\varepsilon^2 = \left( -G_{TT}^v + \frac{-G_{N_1^v N_2^v}^v N^{v2}}{y(1-y)} \left(\frac{dy}{dT}\right)^2 - G_{TT}^l + \frac{-G_{N_1^l N_2^l}^l N^{l2}}{x(1-x)} \left(\frac{dx}{dT}\right)^2 \right) dT^2 \qquad (6)$$

In equation 6, the superscripts v and 1 refer to the vapor and the liquid phase, respectively, and y represents the mole fraction of component 1 (i=1) in the vapor phase.

By maintaining the thermodynamic distance between stages, the exergy consumed by the process is minimized. The method can be applied to any staged externally-controlled systems, such as, for example, distillation processes, chemical reactor processes, membrane separation processes (e.g., isotope diffusion processes), and centrifugation processes.

Without further elaboration, it is believed that one skilled in the art can, based on the description herein, utilize the present invention to its fullest extent. All publications cited herein are hereby incorporated by reference. The following specific examples are, therefore, to be construed as illustrative, and not limitive of the remainder of the disclosure.

A Distillation Column

Referring to FIG. 1, the operation of the invention requires controlled flow of heat at each tray. The controls employed serve to thermostat each tray to a specific temperature. The sequence of temperatures is specified by making the thermodynamic distance between trays constant.

Figure 1A:
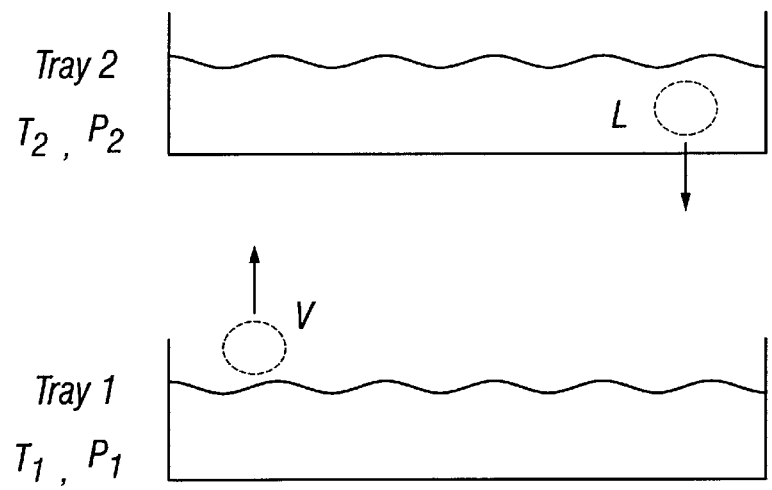
FIG. 1A is a schematic diagram of two adjacent trays in the column showing the flow of v moles of vapor and l moles of liquid while operating between two temperatures and pressures.

Referring to FIG. 1A, the thermodynamic distance between tray 1 and tray 2 is given by equation 7:

$$\int_{(T_1, p_1)}^{(T_2, p_2)} \sqrt{(dTdS + dpdV)} \Big/ T \qquad (7)$$

where, in the limits of integration, $T_i$ and $p_i$ are the temperature and pressure in tray i, where i=1 or 2. The thermodynamic quantities in the integrand correspond to a two phase equilibrium system consisting of l moles of liquid and v moles of vapor having the initial compositions of the liquid and vapor on tray 1. l is the molar amount of liquid moving from tray 2 to tray 1 in a unit of time. v is the molar amount of vapor moving from tray 1 to tray 2 in a unit of time. If the pressure does not change appreciably between the two trays, the second term in the radicand vanishes and the integral simplifies to give equation 8:

$$\|Tray\ to\ Tray\ Distance\|_S = \int_{T_1}^{T_2} \frac{\sqrt{\|dT\|_E^2}}{T} = \int_{T_1}^{T_2} \frac{\sqrt{C_R}}{T} dT \qquad (8)$$

where $C_R$ is the heat capacity of the two phase thermodynamic system that consists of l moles of liquid and v moles of vapor (i.e., the coefficient of $(dT)^2$ in equation 6). For an ideal binary mixture, for example, $C_R$ is given by equation 9:

$$C_R = v\left[ yC_{p1}^v + (1-y)C_{p2}^v + \frac{T\Gamma^v}{y(1-y)}\left(\frac{dy}{dT}\right)^2 \right] + l\left[ xC_{p1}^l + (1-x)C_{p2}^l + \frac{T\Gamma^l}{x(1-x)}\left(\frac{dx}{dT}\right)^2 \right] \qquad (9)$$

In this formula, x and y are the equilibrium mole fractions of component 1 in the liquid and vapor phases, respectively.

$C_{pi}^l$ and $C_{pi}^v$ are the partial molar heat capacities of each component i (where i=1 or 2) in the liquid and vapor phases, respectively. The values for $\Gamma^v$ and $\Gamma^l$ are given by equations 10 and 11, respectively.

$$\Gamma^l = -l\frac{\partial \mu_2^l}{\partial l_1} = -l\frac{\partial \mu_1^l}{\partial l_2} \qquad (10)$$

$$\Gamma^v = -v\frac{\partial \mu_2^v}{\partial v_1} = -v\frac{\partial \mu_1^v}{\partial v_2} \qquad (11)$$

The quantities $\mu_i^l$ and $\mu_i^v$ are chemical potentials of each component i (where i=1 or 2) in the liquid and vapor phases, respectively, and where:

$l_1 = xl;$ $l_2 = (1-x)l;$ $v_1 = yv;$ and $v_2 = (1-y)v.$

Finally, v and l are given by equations 12 and 13, respectively.

$$v = \frac{xM_{Flow} - x_{Flow}}{x - y} \qquad (12)$$

$$l = \frac{x_{Flow} - yM_{Flow}}{x - y} \qquad (13)$$

The quantities $x_{Flow}$ and $M_{Flow}$ are the net tray-to-tray material transport. For a distillation column with no sidestream addition or removal, material transport is described by the equations $x_{Flow} = x_D$ D and $M_{Flow} = D$ for the rectification portion of the column and $x_{Flow} = -x_B$ B and $M_{Flow} = -B$ for the stripping portion of the column. In these equations, D is the number of moles of distillate extracted per unit of time, B is the number of moles of bottoms removed per unit of time, and $x_D$ and $x_B$ are the mole fractions of one component (i=1) in the bottom and distillate, respectively. For columns with sidestream flows, these quantities are adjusted according to Kirchoff's laws.

Figure 2:
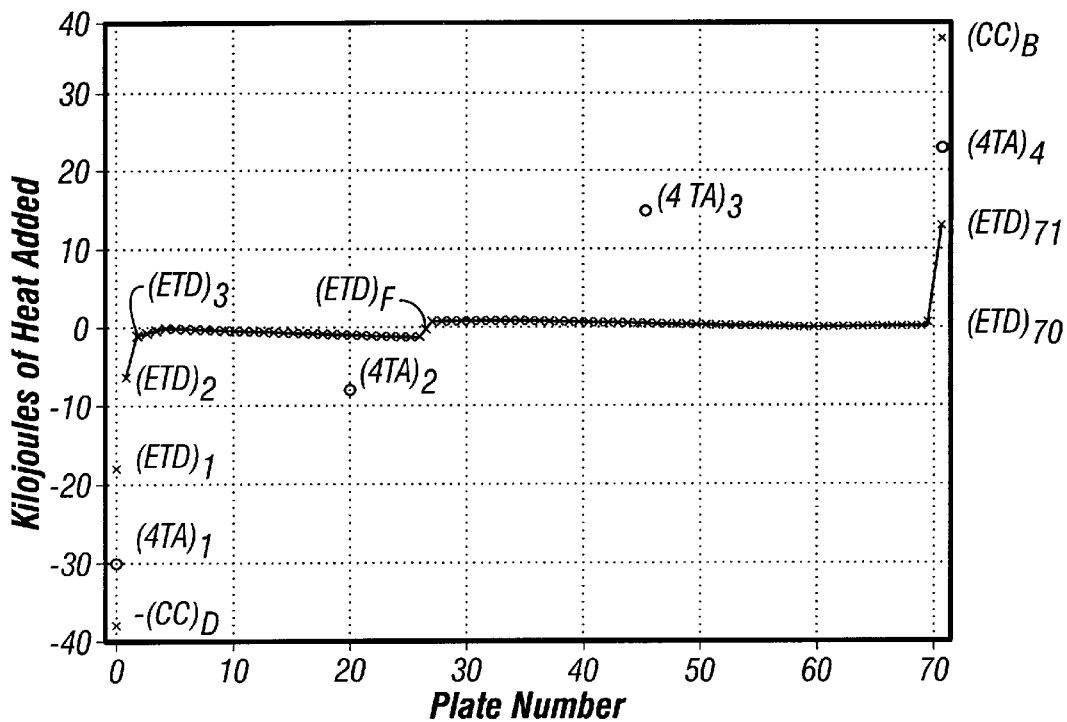
FIG. 2 is a graph showing the comparative heat requirements for a conventional distillation column, an optimally adjusted column containing four trays, and an equal thermodynamic distance column containing 71 trays.

Referring to FIG. 2, the comparative heat requirements for three different distillation columns are plotted. This example compares the separation of a 50/50 mole percent solution of benzene and toluene into 99% pure products using a 71 tray column. For a conventional column (CC), heat is added at the bottom of the column, corresponding to point $(CC)_B$, and extracted at the top, point $(CC)_D$. The need to add or remove heat is substantially reduced by employing as few as four thermally active trays (4TA), as shown by points $(4TA)_1$–$(4TA)_4$. The truly significant improvement of employing a multiplicity of trays (71 in the example shown) spaced at equal thermodynamic distances is shown by curve ETD on the graph. The heat extracted for the first two trays (points $(ETD)_1$ and $(ETD)_2$) is significant, but is substantially less than that of the conventional column, or the 4TA column. Similarly, the heat added at the bottom tray (point $(ETD)_{71}$) is also significant but is still less than for the other two columns. The best overall measure of the energy efficiency of the three designs is given by the exergy consumption. Calculations based on $T_0 = 273$ K multiplied by the entropy produced by the process give:

*CC:* 842 J/mole of feed

*4TA:* 423 J/mole of feed

*ETD:* 191 J/mole of feed

The equal thermodynamic distance column thus represents an exergy savings of 55% over the column with four thermally active trays (4TA), and a savings of 77% over the conventional column (CC).

To achieve this sort of savings in operation, it is necessary to use more trays than would be employed in conventional operation. The capital equipment costs of the additional trays and the tandem heat pump to supply the heats required by ETD operation are offset by the significantly smaller heat exchangers required and by the energy savings.

Figure 3:
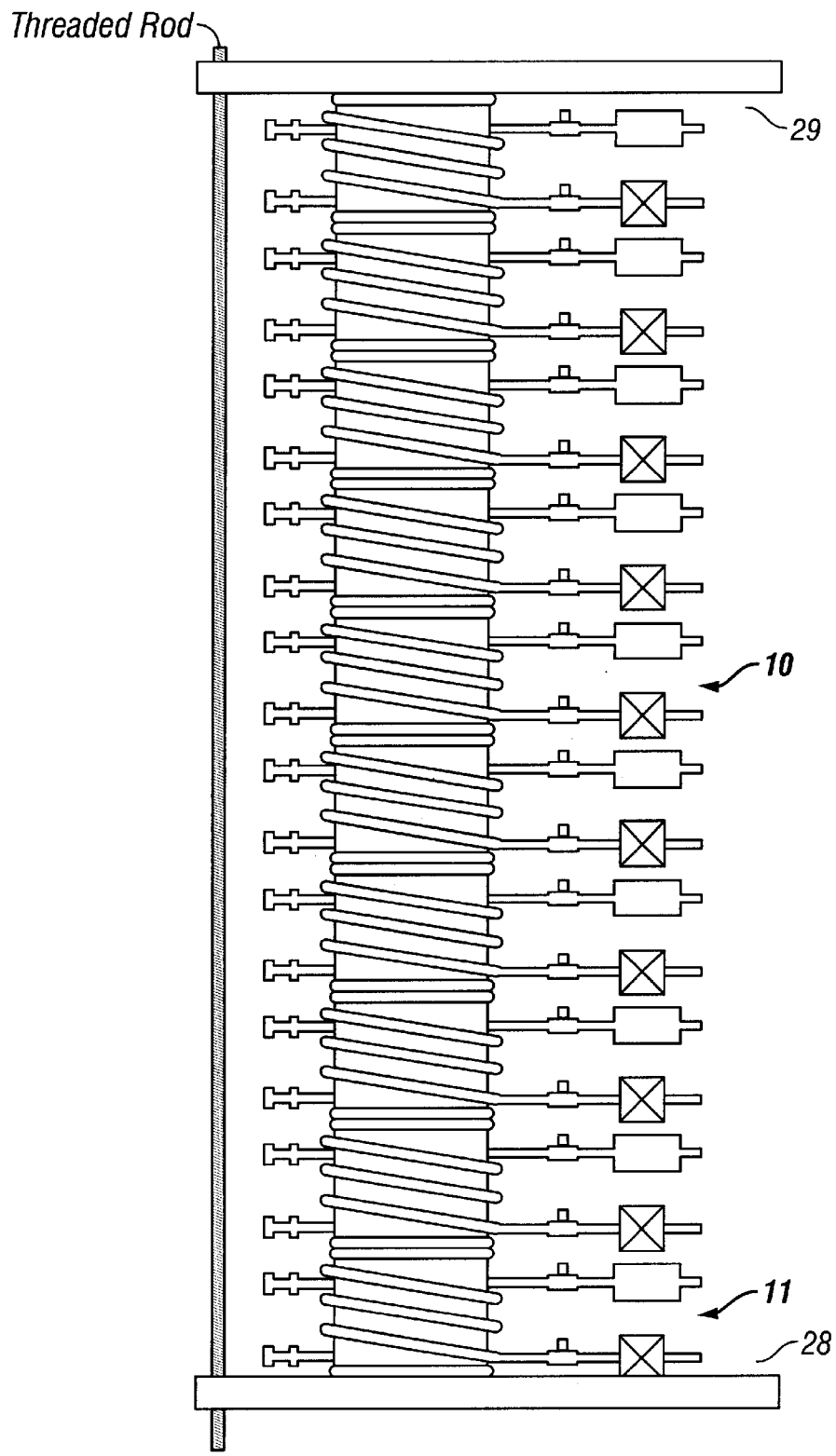
FIG. 3 is a diagram, also in schematic form, showing a multiple tray distillation column.
Figure 4:
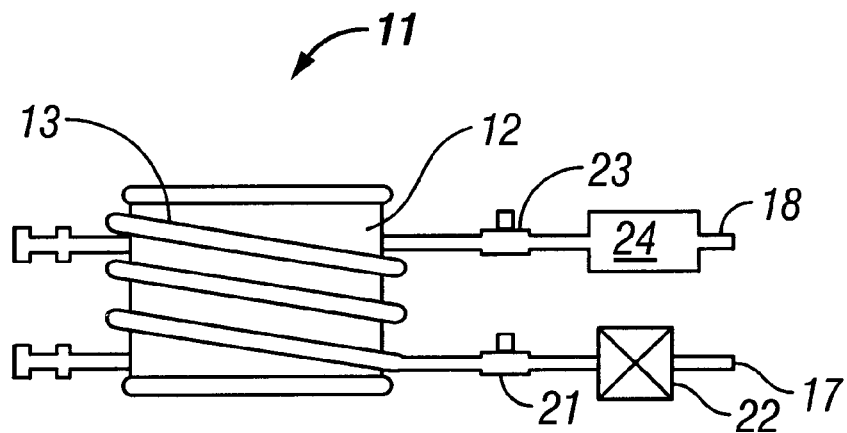
FIG. 4 is a diagram showing the components of an individual tray of FIG. 3.
Figure 5:
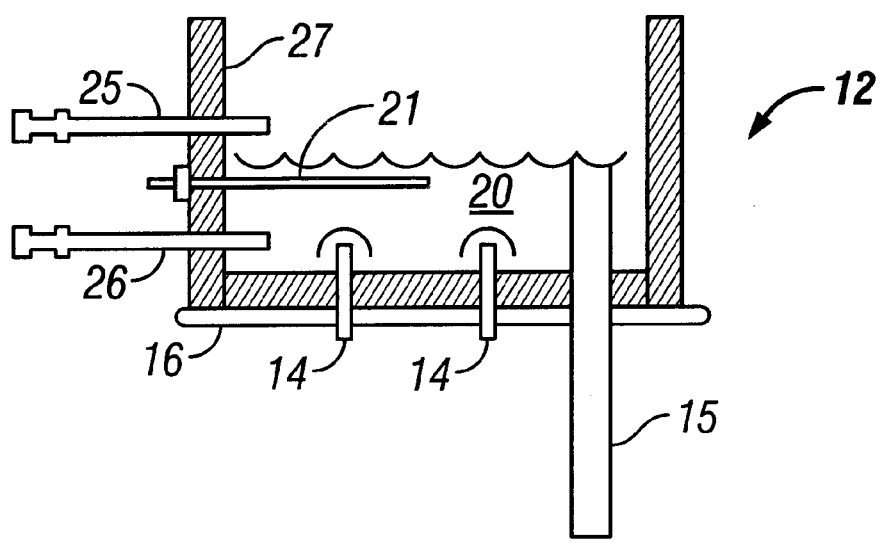
FIG. 5 is a schematic diagram of the interior of the tray of FIG. 4.

Referring to FIG. 3, distillation column 10 has a multiplicity of trays 11, a distillation bottom 28 and a distillation top 29. Referring to FIG. 4, each of the trays 11 include a cylindrical vessel 12 wrapped with heat exchange coils 13. Referring to FIG. 5, vessel 12 is sealed by contacting another tray 11 located on top of the vessel, except for bubble cap tubes 14 and a weir tube 15 mounted in and extending through the bottom 16 of the vessel 12.

During distillation, distillation liquid 20 is contained in the vessel 12. Vapor formed in a lower tray enters the next upper tray via bubble tubes 14 and bubbles through the liquid 20. Overflow liquid drains back to the lower tray through the weir tube 15. Each of the heat exchange coils 13 is connected to a supply conduit 17 and an outlet coil 18. The temperature of each tray 11 is maintained by controlling the flow of heat transfer fluid through the coil 13 using an RTD 21 and a solenoid valve 22, which are interposed in the inlet conduit 17, and a second RTD 23 and a mass flowmeter 24, which are interposed in the outlet conduit 18. Optional sampling conduits 25 and 26 extend through the side wall 27 of the vessel 12 through which samples may be taken of the gas and liquid phases, respectively.

The Tandem Heat Pump

Figure 6:
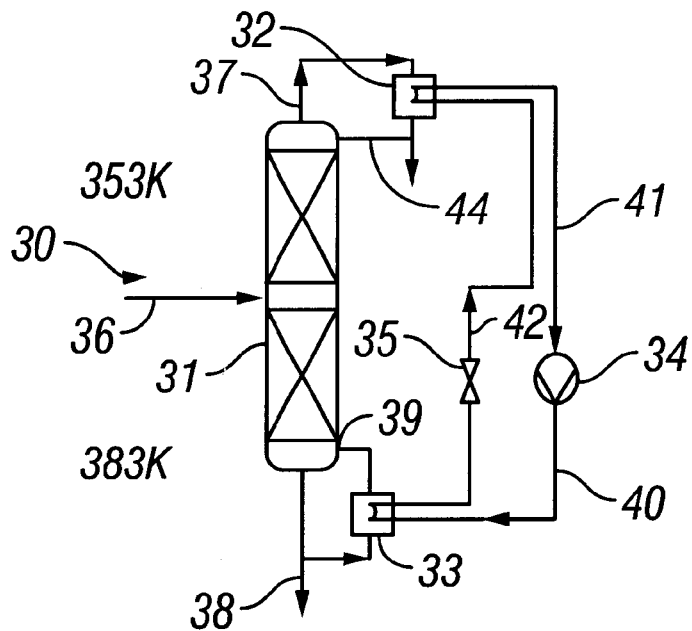
FIG. 6 is a schematic diagram of a distillation column employing two heat exchangers.

A tandem heat pump system is preferably utilized to control the temperature of the trays and the heat flow in the distillation system. Referring to FIG. 6, distillation system 30 includes a distillation column 31, a first upper heat exchanger 32, a second lower heat exchanger 33, a compressor 34, and a throttling. valve 35. Feedstock is introduced into the column 31 through a feed conduit 36 and removed as a top product through a distillate conduit 37, and as a bottom product through a bottom conduit 38. Part of the bottom product is fed back to the column 31 through a return conduit 39. Likewise, part of the distillate is returned to the column as reflux through reflux conduit 44.

The upper heat exchanger 32 is in thermal contact with the distillate conduit 37 and serves as a condenser for the distillation column 31. It also serves as an evaporator for the heat pump. The lower heat exchanger 33 is in thermal contact with the return conduit 39, and serves as reboiler for the distillation column 31 as well as a condenser for the heat pump. Refrigerant is circulated between the heat exchangers 32 and 33 by a compressor 34. The compressor 34 is connected to the bottom heat exchanger 33 by a first refrigerant conduit 40 and to the upper heat exchanger through a second refrigerant conduit 41. A third refrigerant conduit 42 completes the circuit by connecting the heat exchangers 32 and 33. A throttling valve 35 is interposed in the third refrigerant conduit 42 and serves to restrict the flow of refrigerant between the heat exchangers 32 and 33. In one example, the distillation column 31 operates between the temperatures of 383 K at the bottom and 353 K at the top.

In operation, vapor from the top of the distillation column 31 is condensed in the upper heat exchanger 32 which transfers heat to evaporate the refrigerant. The refrigerant is then compressed by the compressor 34 and fed to the lower heat exchanger 33. The compressed refrigerant is condensed at a higher temperature in the lower heat exchanger 33. The condensed high pressure refrigerant is throttled through the valve 35 and returned to the upper heat exchanger 32.

This type of system has been employed in the prior art and has the advantage of being able to utilize conventional heat pumps if the temperatures do not exceed 130° C., at which temperature the refrigerant could become chemically unstable. The main disadvantage of this system is that two heat exchangers are required, creating large temperature and pressure drops within the refrigerant system.

Figure 7:
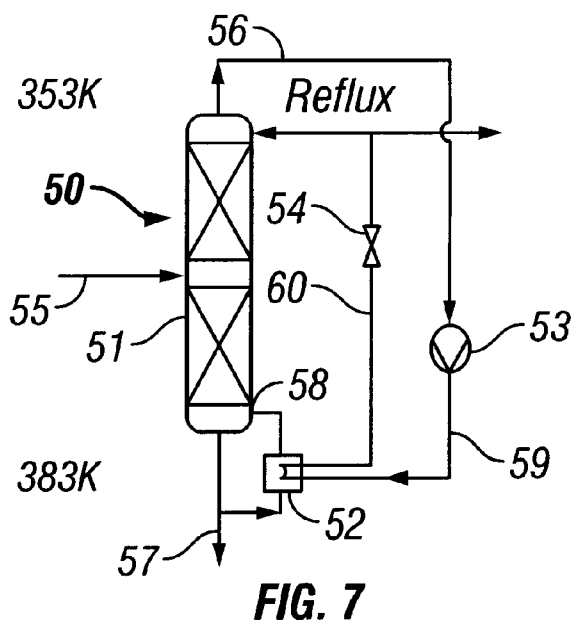
FIG. 7 is a schematic diagram of a vapor recompression column employing only one heat exchanger.

Referring to FIG. 7, there is illustrated another distillation system coupled to a heat pump and called a vapor recompression system 50. The system 50 includes a distillation column 51, a heat exchanger 52, a compressor 53, and a throttling valve 54. Feedstock is supplied to the column 51 through a feed conduit 55, and removed as a top product through a distillate conduit 56, and as a bottom product through a bottom conduit 57. A portion of the bottom product extracted through bottom conduit 57 is returned to the column 51 through a return conduit 58. The compressor 53 is connected to the heat exchanger 52 by a refrigerant conduit 59, and the circuit is completed by a conduit 60 connecting the exchanger 52 to the top of the column 51 through the throttling valve 54.

In operation, the low temperature, low pressure vapor is extracted from the top of the distillation column 51 through distillate conduit 56 and compressed by the compressor 53 raising its temperature and pressure. The vapor then condenses in the heat exchanger 52 where it transfers heat to the bottom of the distillation column 51 through refrigerant conduit 59. Much of the condensate is removed as product, but some of it is directed back to the top of the distillation column 51 through conduit 60.

This system shown in FIG. 7 has an advantage over the system of FIG. 6 in that only one heat exchanger is required, with correspondingly smaller temperature and pressure drops within the system. In theory, this system could be used with any distillation column. In practice, very few distillates are acceptable refrigerants.

Referring again to FIG. 2, it is noted that in the graph of the equal thermodynamic distance (ETD) system, large amounts of heat are extracted at the first two trays (corresponding to points $(ETD)_1$ and $(ETD)_2$ at the top of the column). Also, a large amount of heat is added at the bottom (corresponding to point $(ETD)_{71}$). The absolute amounts of heat are roughly one-third of what would be required in a conventional column (in comparison to points $(CC)_D$ and $(CC)_B$). A conventional vapor compression heat pump, as shown and described in FIG. 6, could be employed to add and extract heat at each end of the curve, except that the heat pump could be roughly one-third the size of what would otherwise be required.

Figure 6A:
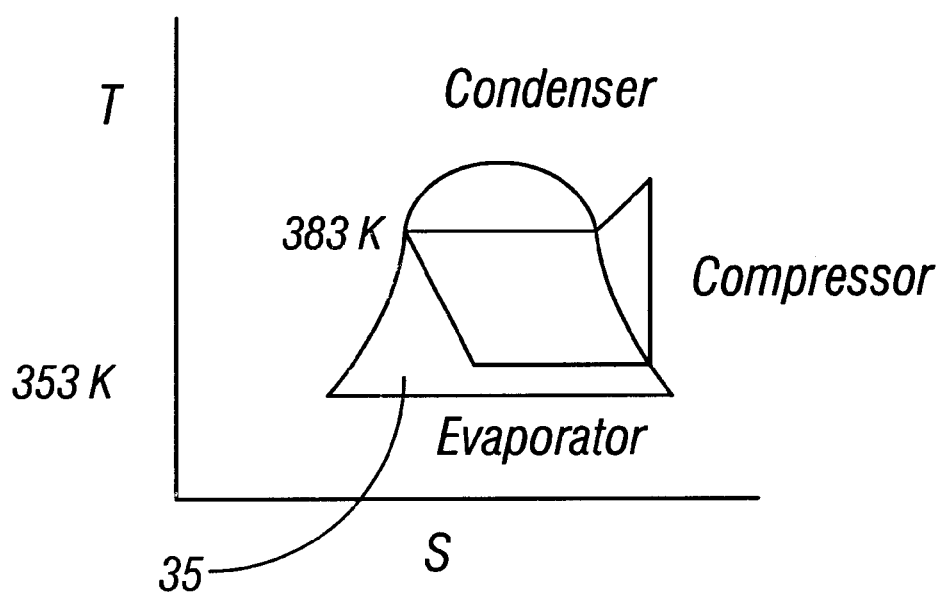
FIG. 6A is a graph of the operational cycle of the column of FIG. 6.

Referring to FIG. 6A, it is to be noted that the refrigerant working fluid goes through its maximum temperature change twice in traveling along the paths from one heat exchanger to the other. The temperature change the refrigerant experiences corresponds to the full temperature change in the distillation column. It is proposed that the forms of heat transfer at each of the trays between $(ETD)_3$ and $(ETD)_{70}$ could be exchanged with the heat pump refrigerant while traveling along one or both of these heat pump paths. For example, consider the path through the compressor 34. It is well known that intercooled compression reduces the amount of work required for a compression process and improves the performance of heat pumps. At the trays where heat needs to be added (between $(ETD)_F$ and $(ETD)_{70}$), this heat could be supplied by the refrigerant used for intercooling the heat pump. In practice, intercoolers are widely used to improve the performance of heat pumps, but using more than one or two is impractical. The multiple tray ETD system of this invention requires some form of heat exchange at each tray.

Referring again to FIG. 6A, the refrigerant passing through the throttling valve 35 experiences the same maximum temperature change as that passing through the compressor 34. The resulting temperature differential can serve as a heat source or sink, as required, at the optimized temperatures for each of the trays 11 in distillation column 31. In a preferred embodiment, the throttling valve 35 takes the form of a long small bore tube. The drag. imposed on the refrigerant as it moves through the third refrigerant conduit 42 alters the pressure, thus throttling the refrigerant. Coincident with this pressure drop, the temperature of the refrigerant drops from the highest to the lowest values in the distillation column. Consequently, steady state temperatures in this tube can be associated with specific points along the conduit. In this embodiment and FIG. 4, the conduit 17 is wrapped as a heat exchange coil 13 around the vessel 12 in each tray 11 of the distillation column 10. The result is an integrated system comprising a multiplicity of distillation trays in tandem with a heat pump system for thermally controlling each tray at a prescribed optimum temperature.

Figure 8:
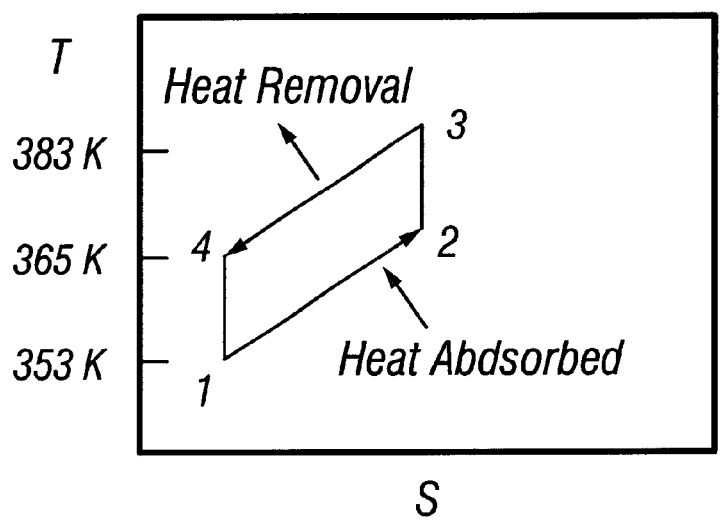
FIG. 8 is a graph of a reversed Brayton cooling cycle.

As an alternative embodiment, the heat exchange function can be obtained by utilizing two different types of heat pumps. For the top and the bottom trays of the column, where large amounts of heat are added or extracted, a conventional vapor compression heat pump or vapor recompression heat pump can be employed as previously described. The only difference in this pump would be its heat exchange capacity, which would need to be only about one-third that of a conventional heat pump. For the intermediate trays (between points $(ETD)_3$ and $(ETD)_{70}$) a different type of heat pump can be employed based on the reversed Brayton cycle. A graph of the reversed Brayton cycle is shown in FIG. 8. This type of heat pump is used in specialized heat pumping or cooling applications, as for example, in the air-conditioning of commercial aircraft. The operational characteristics of this heat pump are not ideal for air-conditioning because it absorbs heat through a range of temperatures shown between points 1 and 2 in FIG. 8. Similarly, this pump rejects heat through a range of temperatures as shown between points 3 and 4. These characteristics are not optimum for most one temperature heat pumping or cooling applications, and are typically competitive only in situations where weight is a consideration in selecting an appropriate heat pump. However, these same characteristics are a close match for the heat transfer requirements of the intermediate trays of the ETD system. As can be seen from the example in FIG. 8, heat is absorbed between the temperatures of about 353 K and 368 K, and removed between the temperatures of about 383 K and 365 K. In the example shown for the ETD system, the average temperature for each of the intermediate trays in which heat is extracted is 359.5 K, and the average temperature for the trays in which heat is added is 374 K. This operating range makes the reversed Brayton cycle more. efficient than the conventional vapor compression heat pump which operates through a wider average temperature difference between 353 K and 383 K. Thus, the combination of tandem heat pumps using a conventional vapor compression pump for the ends of the column, and the reversed Brayton pump for the intermediate trays can control the temperature and heat transfer precisely as required throughout the system.

Other embodiments are within the scope of the claims. For example, as a second alternative embodiment, the Brayton cycle, supplying heat exchanges $(ETD)_3$ through $(ETD)_{70}$, can be used with conventional reboilers and condensers which can be of significantly reduced capacities. This embodiment is similar to the 4TA operation, except that the intermediate heat exchangers occur along the entire length of the column rather than at one intermediate tray resulting in a significant exergy savings as compared with the 4TA design.

Figure 9:
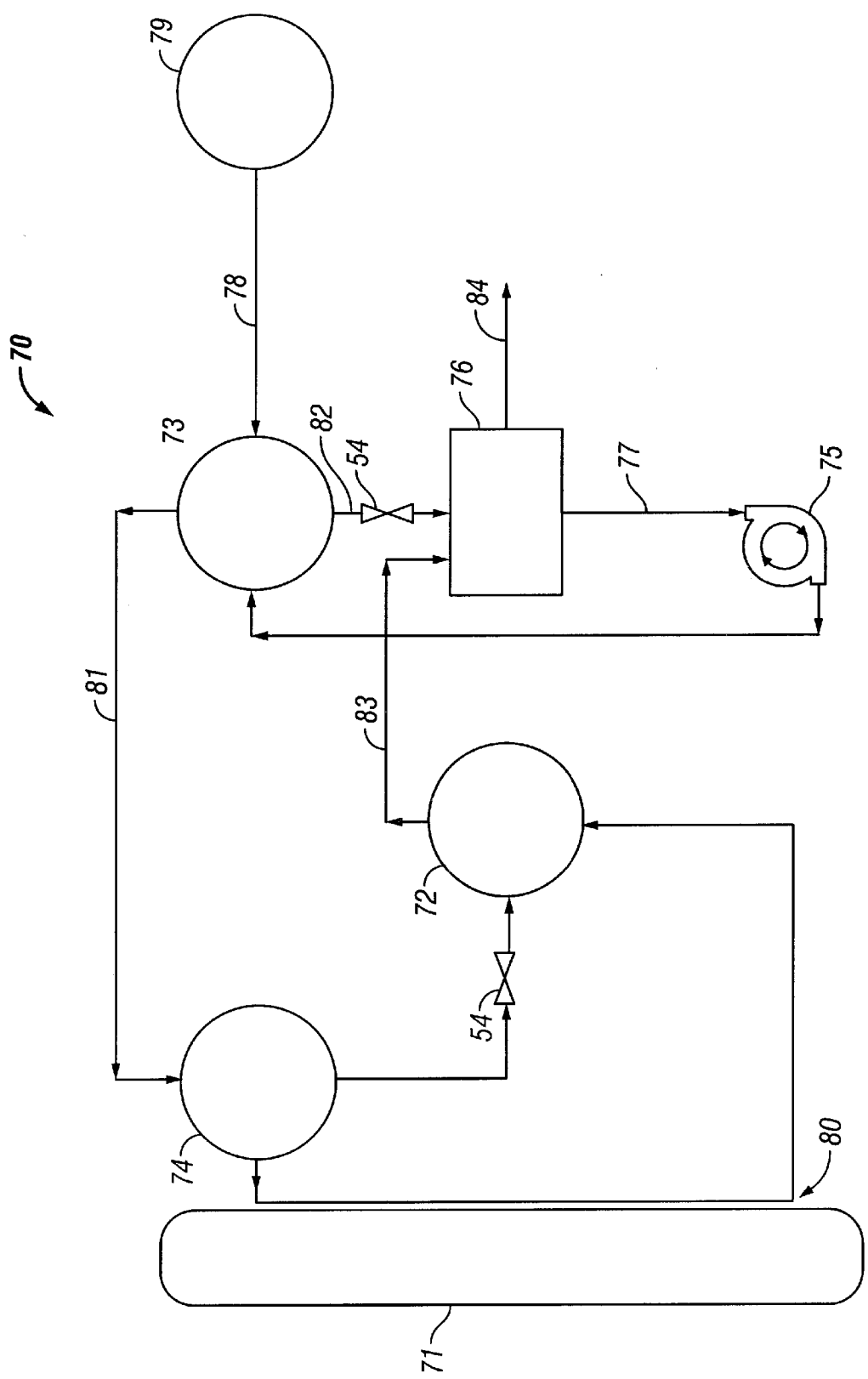
FIG. 9 is a schematic diagram of a distillation column employing an absorption refrigeration system.

In another embodiment, an absorption heat pump 70, such as the one shown in FIG. 9, can be employed instead of the compressor powered system described in the first and second embodiments to thermally control distillation column 71. Evaporator 72 and condenser 74 are in thermal contact 80 with column 71. This would have the benefit of a less drastic change in current designs since it could be powered by heat from the reboiler at the bottom tray as in a conventional column. Suitable wrapping of the columns and throttling by means of small diameter tubing can again provide a good match to the heat requirements $(ETD)_1$ through $(ETD)_{71}$ of the column as the refrigerant in the absorption heat pump system moves from the condenser to the evaporator.

OTHER EMBODIMENTS

From the above description, the essential characteristics of the present invention can be ascertained. Without departing from the spirit and scope thereof, various changes and modifications of the invention can be made to adapt it to various usages and conditions. Thus, other embodiments are also within the claims. The other standard parts of the absorption heat pump, namely generator (73), pump (75), and absorber (76) function as normal without contact with the column. Pump (75) carries strong solution (77) from absorber (76) to generator (73), which receives high temperature heat (78) from a heat source (79) and acts as the primary power source for the column. Generator (73) produces high pressure refrigerant vapor (81) which is passed to condenser (74) and weak solution (82) which is throttled though throttling valve (54) and returned to absorber (76). Absorber (76) receives low pressure vapor (83) from evaporator (72) and passes waste heat (84) to the atmosphere or other heat sink.

What is claimed is:

1. A method of minimizing exergy consumption in a distillation system comprising the step of thermostatically maintaining substantially equal thermodynamic distances between each tray in the system by controlling heat delivered to or extracted from each tray.

2. The method of claim 1, wherein the thermodynamic distance between trays is calculated using the second derivative of the system entropy as a Reimannian metric.

3. A method of minimizing exergy consumption in a distillation system comprising the step of thermostatically maintaining substantially equal thermodynamic distances between each tray in the system by controlling pressure at each tray.

4. The method of claim 3, wherein the thermodynamic distance between trays is calculated using the second derivative of the system entropy as a Reimannian metric.

5. A method of minimizing exergy consumption in a distillation system comprising the step of thermostatically maintaining substantially equal thermodynamic distances between each tray in the system by controlling concentration of a chemical component at each tray.

6. The method of claim 5, wherein the thermodynamic distance between trays is calculated using the second derivative of the system entropy as a Reimannian metric.

* * * * *